United States Patent [19]

Kameya

[11] 4,172,276
[45] Oct. 23, 1979

[54] FLYBACK TYPE SWITCHING POWER SOURCE DEVICE

[75] Inventor: Kazuo Kameya, Tsurugashima, Japan

[73] Assignee: Toko, Inc., Tokyo, Japan

[21] Appl. No.: 847,822

[22] Filed: Nov. 2, 1977

[30] Foreign Application Priority Data

Nov. 20, 1976 [JP] Japan .................. 51-139768

[51] Int. Cl.$^2$ .......................... H02M 3/335
[52] U.S. Cl. ...................... 363/19; 363/124
[58] Field of Search ............ 323/17, DIG. 1; 363/16, 363/18-21, 124

[56] References Cited

U.S. PATENT DOCUMENTS

| | | | |
|---|---|---|---|
| 3,295,042 | 12/1966 | Evalds et al. | 363/18 |
| 3,702,961 | 11/1972 | Erickson | 363/19 |
| 3,928,793 | 12/1975 | Waltz | 363/19 |
| 4,034,281 | 7/1977 | Morita et al. | 363/124 X |
| 4,068,158 | 1/1978 | Hicks et al. | 323/17 |

Primary Examiner—A. D. Pellinen
Attorney, Agent, or Firm—Schwartz, Jeffery, Schwaab, Mack, Blumenthal & Koch

[57] ABSTRACT

A flyback type switching power source device alternately having a time during which energy is stored in a transformer and a time during which the stored energy is taken out. A current flowing into the primary winding of the transformer or out of the secondary winding thereof is detected, and the current thus detected is converted into a DC voltage proportional to the magnitude thereof. Furthermore, a voltage resulting from superimposition of the DC voltage upon a reference voltage is compared with a DC voltage resulting from conversion of a voltage induced in a tertiary winding of the transformer during the time for taking out the energy stored in the transformer to control the time during which energy is stored in the transformer.

6 Claims, 15 Drawing Figures

FLYBACK TYPE SWITCHING POWER SOURCE DEVICE

This invention relates to means for stabilizing the output voltage produced across a load in a flyback type switching power source alternately having a time during which energy is stored by turning on a switching element such as transistor or the like from a DC power source through transformer winding to flow a current to the transformer winding and a time during which the energy is taken out by turning off the switching element to flow the current out of the transformer winding.

Usually, in a flyback type and floating type switching power source device wherein the primary and the secondary circuit of the transformer must be isolated DC-wise, the output voltage produced at the output end of the secondary circuit is detected by comparison with a reference voltage and the resulting detection output is fed back to the other winding of the transformer by a light emitting element such as photo-coupler or by an AC modulation circuit. By this, the detection output is transmitted while being isolated DC-wise with respect to the primary circuit, and modulates the pulse width in an oscillation circuit provided in the primary circuit, thereby stabilizing the output voltage produced at the output end of the secondary circuit. However, the above-described voltage stabilizing system involves a complicated circuit arrangement and a number of parts, and moreover requires cumbersome procedures in the adjustment for obtaining an excellent voltage stabilization characteristic against fluctuations of the power source voltage, load current, etc., with a result that the switching power source device has become expensive.

It is an object of the present invention to eliminate the above-noted disadvantages and to provide a flyback type switching power source device having an excellent voltage stabilizing characteristic for fluctuations of the source voltage, load current, etc.

Thus, the present invention provides a flyback type switching power source device alternately having a time during which energy is stored in a transformer winding by flowing a current to the transformer winding and a time during which the stored energy is taken out, characterized by means for detecting a flow of current into or out of the transformer winding, and means for converting the current into a DC voltage proportional to the magnitude thereof, whereby a voltage consisting of the DC voltage resulting from the conversion by the converter means and superposed on a reference voltage is compared with an induced voltage produced across the transformer winding when said current flows out of the transformer winding.

Other objects, features and advantages of the present invention will become apparent from the foolowing description taken in conjunction with the accompanying drawings.

In order to give a better understanding of the present invention, description will first be made with reference to FIG. 1 which shows an example of the conventional flyback type switching power source having simplified circuit construction.

In the Figure, a transformer $T_1$ comprises a primary winding $L_1$, a secondary winding $L_2$ and a tertiary winding $L_3$. The emitter of power transistor $Q_1$ is grounded, the collector thereof is connected to a DC power source $E_B$ through the primary winding $L_1$ of the transformer $T_1$, and the base thereof is connected to the DC power source $E_B$ through a bias resistor $R_B$. A rectifying diode $D_C$ has its cathode connected to the emitter of the power transistor $Q_1$ through the tertiary winding $L_3$ of the transformer $T_1$, and its anode is grounded through a capacitor $C_C$. The connection point between the anode of the rectifying diode $D_C$ and the capacitor $C_C$, namely, potential reference point S, is connected to the base of the power transistor $Q_1$ through Zener diode $Z_D$. Further connected to the secondary winding $L_2$ of the transformer $T_1$ is a rectifying and smoothing circuit comprising a rectifying diode $D_R$ and a choke coil $L_R$ and capacitors $CR_1$ and $CR_2$. Connected between the output terminals a and b is a load resistor $R_L$.

The circuit operation in the above-noted construction will now be described.

Figure 2A:
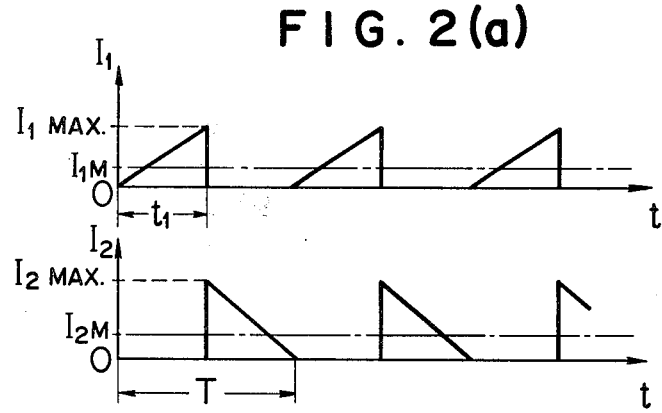
FIG. 2(a) illustrates the operating waveforms of FIG. 1 wherein the power available across a load $R_L$ is low.
Figure 2B:
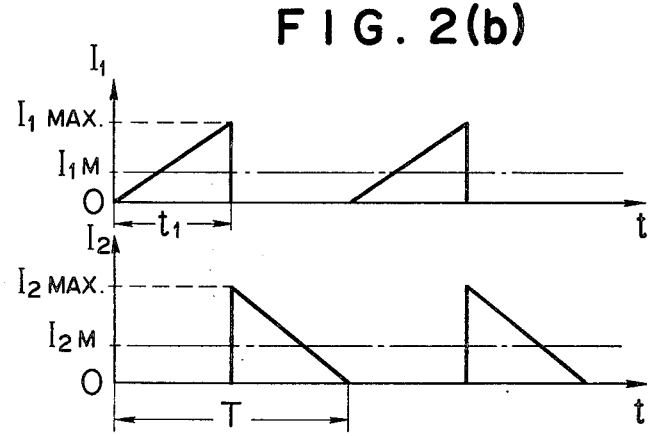
FIG. 2(b) shows the case where the power available thereacross is high.

With respect to a current $I_1$ flowing to the primary winding $L_1$ of the transformer $T_1$ and a current $I_2$ flowing to the secondary winding $L_2$ of the transformer $T_1$, FIGS. 2(a) and 2(b) illustrate the relations of the current waveforms with changes of time. Note, however, that FIG. 2(a) refers to the case where the power taken out at the resistor $R_L$ is small, and FIG. 2(b) refers to the case where the power taken out at the resistor $R_L$ is great.

Assume that the power transistor has conducted when time t is zero. The current $I_1$ flows to the primary winding $L_1$ of the transformer $T_1$ and this current flows into the primary winding $L_1$ in the relation that $I_1 = -(E_B/L_1)t$. That is, the current $I_1$ is linearly increased with changes of time, whereby energy becomes gradually stored in the transformer $T_1$ and when time t has become $t = t_1$, the current $I_1$ reaches its maximum value $I_1$max. Thereupon, the power transistor $Q_1$ is turned off, so that the current $I_1$ also becomes zero. Further, the energy stored in the transformer $T_1$ is induced in the secondary winding $L_2$ thereof and thus, the current $I_2$ flows out of the secondary winding $L_2$ in the relation that $$I_2 = I_{2max} (1 - \frac{t - t_1}{T - t_1}).$$

That is, the current $I_2$ is linearly decreased with changes of time and the energy stored in the transformer $T_1$ is discharged until time t becomes t=T, whereupon the current $I_2$ becomes zero.

By repeating the above-described operation, this device supplies power to the load $R_L$.

When FIGS. 2(a) and (b) are compared, it will be seen that as the load power is increased, the conduction time $t_1$ and the non-conduction time $(T-t_1)$ of the power transistor $Q_1$ are increased, whereby the period T is increased. Further, the maximum current values $I_{1max}$ and $I_{2max}$ are also increased for the increased load current, and this in turn increases average current $I_{1M}$ and $I_{2M}$.

Figure 1:
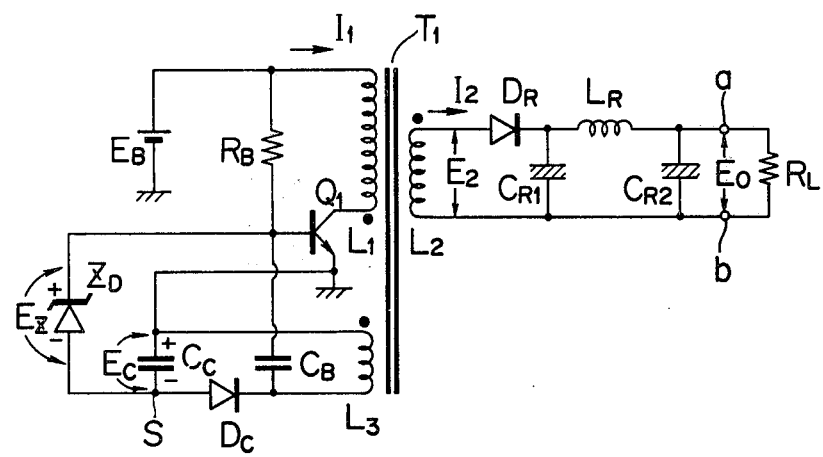
FIG. 1 is a circuit diagram showing an example of the flyback type switching power source device according to the prior art.

Also, the switching power source device of the prior art shown in FIG. 1 effects voltage stabilization by operating the power transistor $Q_1$ so that the comparison voltage $E_C$ produced across the capacitor $C_C$ is always equal to the reference voltage $E_Z$. Further, the comparison voltage $E_C$ is substantially equal to the induced voltage $E_3$ produced across the tertiary winding $L_3$ and the induced voltage $E_2$ produced across the secondary winding $L_2$ is proportional to the turn ratio between the tertiary winding $L_3$ and the secondary winding $L_2$ and thus, the induced voltage $E_2$ always has a predetermined proportional relation to the reference voltage $E_Z$, which voltage $E_Z$ always maintains a substantially constant level to thereby ensure the induced voltage $E_2$ to be always maintained at a constant level.

Thus, the voltage stabilizing system of the prior art has stabilized the induced voltage $E_2$ produced across the secondary winding $L_2$ of the transformer $T_1$, by comparing the reference voltage $E_Z$ produced by the Zener diode $Z_D$ and the comparison voltage $E_C$ produced across the capacitor $C_C$. However, during the time that the induced voltage $E_2$ becomes the output voltage $E_O$ produced between the output terminals a and b, there is an intrinsic voltage drop resulting from the presence of the rectifying diode $D_R$ or the choke coil $L_R$ and in addition, this voltage drop is increased or decreased by increase or decrease in the load current $I_L$, so that the output voltage $E_O$ cannot always be made constant. Strictly, as the load current is increased, the reference voltage $E_Z$ is decreased and thus, the output voltage $E_O$ is more and more decreased. Further, as the load current $I_L$ is increased, the period T is increased as has been explained in connection with FIGS. 2(a) and 2(b), so that the base current of the power transistor $Q_1$ is increased. Thus, the current flowing through the Zener diode $Z_D$ is decreased by an amount corresponding to the increment of the base current of the power transistor $Q_1$, and the reference voltage $E_Z$ is decreased due to the internal resistance of the Zener diode $Z_D$. Further, the winding resistance and leakage inductance of the transformer $T_1$ also act in the direction to decrease the output voltage $E_O$.

Figure 3:
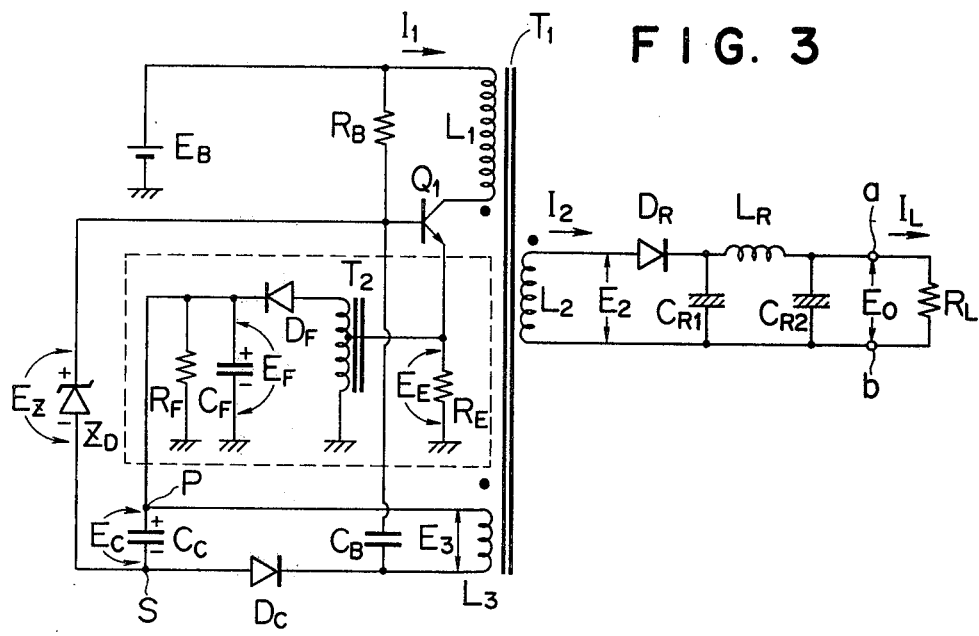
FIG. 3 is a circuit diagram showing an embodiment of the present invention.

Description will now be had to FIG. 3 which shows an embodiment of the flyback type switching power source device emplying the voltage stabilizing system according to the present invention.

The device shown in FIG. 3 comprises the flyback type switching power source device shown in FIG. 1 and the voltage stabilizing and compensating means according to the present invention added thereto. The principal voltage stabilization may be accomplished by the reference voltage source, namely, Zener diode $Z_D$, and fine voltage stabilization may be accomplished by the voltage stabilizing and compensating means.

In FIG. 3, the emitter of power transistor $Q_1$ is grounded through a detecting resistor $R_E$ for detecting a current $I_1$ flowing to the primary winding $L_1$ of transformer $T_1$, and the emitter is also connected to the tap of a detecting transformer $T_2$. The anode of the rectifying diode $D_F$ is grounded through the transformer $T_2$ and the cathode thereof is connected to the potential reference point S through a capacitor $C_C$. Connected to the junction between the capacitor $C_C$ and the rectifying diode $D_F$ are a resistor $R_F$ having one terminal grounded and a capacitor $C_F$.

In the above-described construction, when the power transistor $Q_1$ is in conductive state, the current $I_1$ flows to the primary winding $L_1$ of the transformer $T_1$ which thus stores energy therein, while a detection voltage $E_E$ proportional to the current $I_1$ is intermittently produced across the detecting resistor $R_E$. The detection voltage $E_E$ is boosted to n times by the detecting transformer $T_2$ and rectified by the rectifying diode $D_F$, whereby a DC voltage $E_F$ substantially equal to the peak value of the DC voltage $nE_E$ is produced across the capacitor $C_F$. The tertiary winding $L_3$ of the transformer $T_1$ provides a coupling coil for effecting oscillation, and the output thereof is fed back to the base of the power transistor $Q_1$ by a feedback capacitor $C_B$.

On the other hand, when the power transistor $Q_1$ is in non-conductive state, the energy stored in the primary winding $L_1$ of the transformer $T_1$ produces an induced voltage $E_2$ across the secondary winding $L_2$, whereby an output voltage $E_O$ is produced across the load $R_L$. The tertiary winding $L_3$ of the transformer $T_1$ provides a detecting coil for the induced voltage $E_2$ to the secondary winding $L_2$, and an induced voltage $E_3$ proportional to the induced voltage $E_2$ determined by the turn ratio between the secondary winding $L_2$ and the tertiary winding $L_3$ is produced across the tertiary winding $L_3$, so that a comparison voltage $E_C$ substantially equal to the induced voltage $E_3$ can be obtained across the capacitor $C_C$. Also, the Zener diode $Z_D$ is connected between the potential reference point S and the base of the power transistor $Q_1$ so that the Zener voltage produced across the Zener diode $Z_D$ is available as reference voltage $E_Z$.

Figure 4:
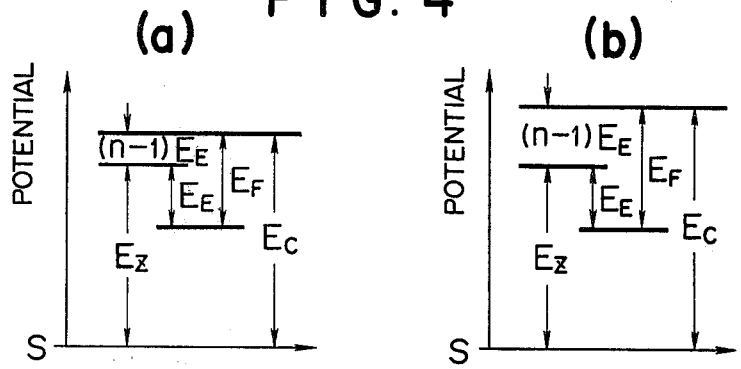
FIG. 4(a) shows the various control voltages of FIG. 3 wherein the load current $I_L$ decreased.
FIG. 4(b) illustrates the case where the load current increased.

In the embodiment shown in FIG. 3, the voltage value which occurs when the power transistor $Q_1$ is switched from its ON state to its OFF state determines the circuit operation and so, the relations among the values of the reference voltage $E_Z$ when the point S is used as the potential reference point, detection voltage $E_E$, DC voltage $E_F$ and comparison voltage $E_C$ are illustrated in FIGS. 4(a) and 4(b) and will be described hereinafter. Note that FIG. 4(a) refers to the case when the load current $I_L$ is decreased and FIG. 4(b) refers to the case where the load current $I_L$ is increased.

Among the various voltage values mentioned above, the detection voltage $E_E$ produced across the detecting resistor $R_E$ comprises a saw tooth voltage which is increased with time t and assumes a maximum value when time $t = t_1$, as will be appreciated from the following expression:

$$E_E = R_E \cdot \frac{E_B}{L_1} (t - \frac{t_1^2}{2T}) \quad (1)$$

It is to be understood, however, that the load impedance and the reactance of the detecting transformer through which the current $I_1$ is flowing are sufficiently higher than the value of the detecting resistor $R_E$.

The detection voltage $E_E$ shown in FIGS. 4(a) and 4(b) is the peak value thereof, namely, the voltage value when time $t=t_1$. This detection voltage $E_E$ is boosted to n times by the detecting transformer $T_2$ and charges the capacitor $C_C$ to its peak value to provide a DC voltage $E_F$, so that when time $t=t_1$, the DC voltage $E_F$ is:

$$E_F = nE_E \quad (2)$$

Also, as is apparent from FIGS. 4(a) and 4(b), the comparison voltage $E_C$ becomes: $E_C = E_Z - E_E + E_F$, and from equation (2) above, $$E_C = E_Z + (n-1)E_E \quad (3)$$

Further, when time $t=t_1$, the comparison voltage $E_C$ is:

$$E_C = E_Z + (n-1) R_E \cdot \frac{E_B}{L_1} t_1 (1 - \frac{t_1}{2T}) \quad (4)$$

That is, as already described in connection with FIGS. 2(a) and (b), time $t_1$ and cyclic period T are increased or decreased by increase or decrease in the load current $I_L$ and thus, the comparison voltage $E_C$ is also increased or decreased, whereby the induced voltage $E_2$ produced across the secondary winding $L_2$ of the transformer $T_1$ may be increased or decreased. Therefore, even if the voltage drop between the induced voltage $E_2$ and the output voltage $E_O$ produced across the load is fluctuated by increase or decrease in the load current $I_L$, the output voltage $E_O$ will not fluctuate but may assume a constant value by suitably preselecting the value of the induced voltage $E_2$.

Figure 5:
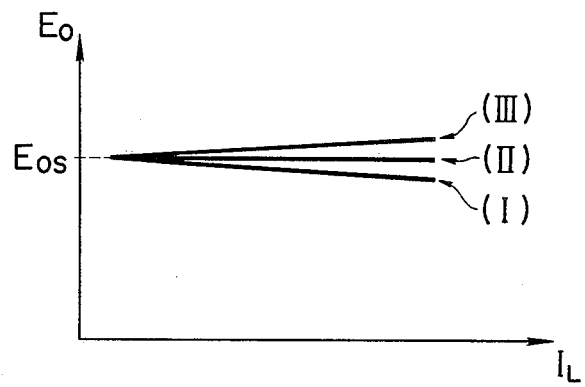
FIGS. 5 and 6 are graphs for illustrating the characteristics of the FIG. 3 embodiment.

FIG. 5 illustrates the relation of the output voltage $E_O$ to the load current $I_L$ in the switching power source device shown in FIG. 3.

In the graph of FIG. 5, voltage stabilizing characteristics (I), (II) and (III) can be arbitrarily obtained by selecting the value of $(n-1)R_E$ in equation (4) which gives the comparison voltage $E_C$. More specifically, characteristic (I) is that when the value of $(n-1)R_E$ is zero, characteristic (II) is that when the value of $(n-1)R_E$ is optimal, and characteristic (III) is that when the value of $(n-1)R_E$ is very great. The internal resistance of the power source device as viewed from the output terminals a, b has a positive value for characteristic (I), substantially zero for characteristic (II), and a negative value for characteristic (III).

If the value of $(n-1)R_E$ in equation (4) which gives the comparison voltage $E_C$ is suitably selected as described, stable output voltage $E_O$ can be obtained even for a very great fluctuation of the load and moreover, it is possible to compensate for not only the voltage drop in the secondary circuit of the transformer $T_1$ but also the fluctuation of the reference voltage $E_z$ caused by the winding resistance and leakage inductance of the transformer $T_1$ and further by the current variation of the Zener diode $Z_D$ and thus, without the necessity of providing a constant current circuit to always flow a constant current to the Zener diode, there can be provided a voltage stabilizing characteristic which is no less excellent than that when the constant current circuit is provided.

A further excellence of the present invention is that the output voltage produced across the load can be stabilized not only against fluctuation of the load current but also against fluctuation of the source voltage. The relation of the output voltage $E_O$ to the source voltage $E_B$ in the switching power source device shown in FIG. 3 is illustrated in FIG. 6 and will hereinafter be described.

Figure 6:
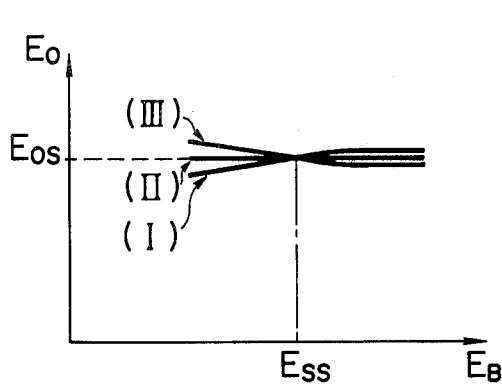

In FIG. 6, voltage stabilizing characteristics (I), (II) and (III) may be arbitrarily obtained by selecting the value of $(n-1)R_E$ in equation (4) which gives the comparison voltage $E_C$. Characteristic (I) is that when the value of $(n-1)R_E$ is zero, characteristic (II) is that when the value of $(n-1)R_E$ is optimal, and characteristic (III) is that when the value of $(n-1)R_E$ is very great. Thus, by suitably selecting the value of $(n-1)R_E$, a stable output voltage $E_O$ may be obtained for a very wide range of variation in source voltage. In addition, the aforementioned value of $(n-1)R_E$ can substantially equally set a good condition for load fluctuation and a good condition for source fluctuation and so, the present invention can provide a switching power source device which can perform voltage stabilization both for load fluctuation and source fluctuation at a time.

Figure 7:
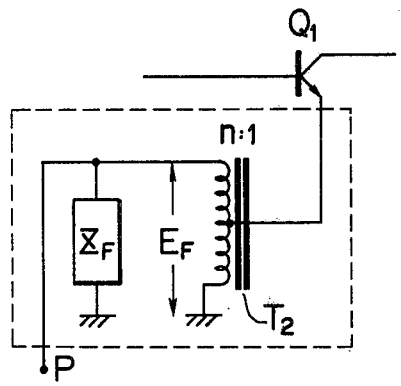
FIG. 7 is a partial circuit diagram showing a modification of the FIG. 3 embodiment.

FIG. 7 shows a modified form of the voltage stabilizing and compensating portion of the switching power source device shown in FIG. 3 useful in the case of a low value DC power source $E_B$.

Description will be made of the case where a load resistance $Z_F$ is parallel-connected to the detecting transformer $T_2$.

Assuming that the reactance of the detecting transformer $T_2$ is sufficiently greater than the load resistance $Z_F$, the equivalent resistance between the tap provided on the detecting transformer $T_2$ and the ground equals the value of $(Z_F/n^2)$. Accordingly, the comparison voltage $E_C$ is:

$$E_C = E_Z + (n-1) \frac{Z_F}{n^2} \cdot \frac{E_B}{L_1} t_1 (1 - \frac{t_1}{2T}) \quad (5)$$

and if the value of $(n-1)(Z_F/n^2)$ is suitably selected in the same manner as in the above-mentioned equation (4), there may be obtained the same effect as described above. Also, if the voltage stabilizing and compensating portion is constructed like the embodiment of FIG. 7, the detecting resistor $R_E$ may be eliminated which was required in the case of the voltage stabilizing and compensating portion of FIG. 3, and the power loss may also be reduced.

Figure 8:
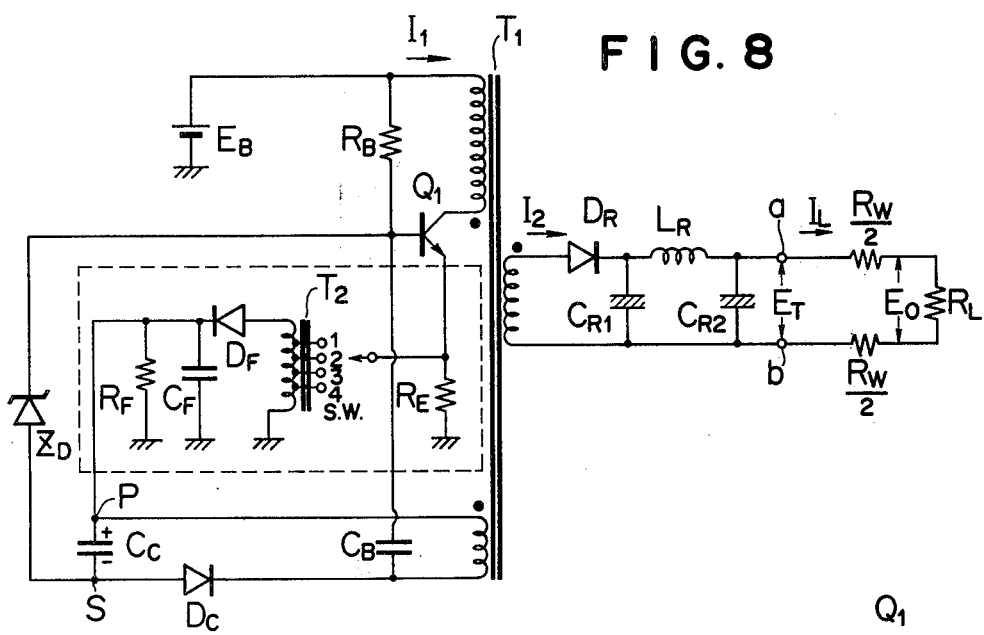
FIG. 8 is a circuit diagram showing another modification of the FIG. 3 embodiment.

To describe a further excellence of the present invention, reference will now be had to FIG. 8 showing a modification of the FIG. 3 embodiment.

The voltage stabilizing and compensating portion shown in FIG. 8 includes a plurality of taps provided on the detecting transformer $T_2$ so that these taps may be arbitrarily selected so as to enable the output voltage produced across the load to be made constant for load fluctuation by a change-over switch SW. Assume that tap (1) of the plurality of taps is selected to set so that the equivalent internal resistance of the power source device becomes zero. When connected to the other taps (2), (3) and (4), the equivalent internal resistance of the power source device as viewed from the output terminals a and b can be made to assume a negative value and moreover, the absolute value thereof can be gradually increased in order of taps (2), (3) and (4).

Generally, a power source device and a load resistance or a device to be supplied with power are connected together by a length of conductor but where the power source device is of a low voltage and heavy current, the resistance value of the conductor is negligible. For example, if the rate of resistance value of the conductor connecting the load resistance $R_L$ to the switching power source device is 1% to the load resistance $R_L$, power loss is increased by 1%, whereby the voltage fluctuation rate across the load resistance $R_L$ is aggravated by 1%. Usually, 1% increase of power loss offers no inconvenience in practice, whereas 1% aggravation of the voltage fluctuation rate is not simply negligible. Therefore, very thick conductor must actually be employed but this is very inconvenient in practice. For this reason, heretofore, a remote sensing function has been separately provided at the output terminal and in addition, four conductors have been necessary to connect the power source device and the load resistance $R_L$, which has meant great cumbersomeness.

According to the present invention, however, as shown in the embodiment of FIG. 8, the equivalent resistance value of the power source as viewed from the load resistance $R_L$ may be made zero by selecting the tap locations on the detecting transformer $T_2$ such that the internal resistance of the power source is made to assume the value of $-R_W$ by the change-over switch SW for the combined resistance value $R_W$ of two conductors connecting the load resistance $R_L$ to the output terminals a and b. Unless the voltage drop resulting from the combined resistance $R_W$ of the two conductors is such that the output voltage is increased by an amount corresponding to the voltage drop on the power source device side, a constant output voltage $E_O$ can not be obtained across the load resistance $R_L$ and therefore, the tap locations on the detecting transformer $T_2$ may be changed by the change-over switch SW to increase the boost ratio in the detecting transformer $T_2$ and accordingly increase the value of the $(n-1)E_E$ in equation (4) which gives the comparison voltage $E_C$, thereby increasing the comparison voltage $E_C$ and accordingly the voltage $E_T$ between the output terminals a and b so as to be substantially equal to the voltage drop resulting from the combined resistance $R_W$ of the aforementioned conductors.

Figure 9:
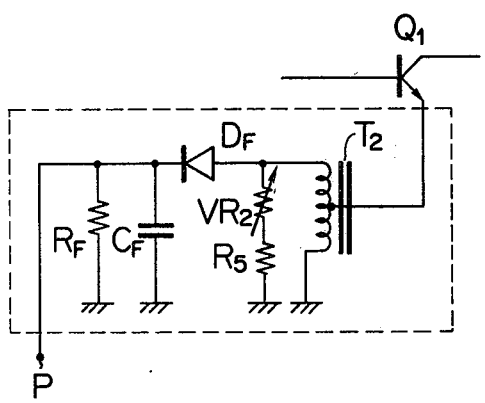
FIG. 9 is a partial circuit diagram showing a further modification of the FIG. 8 embodiment.
Figure 10:
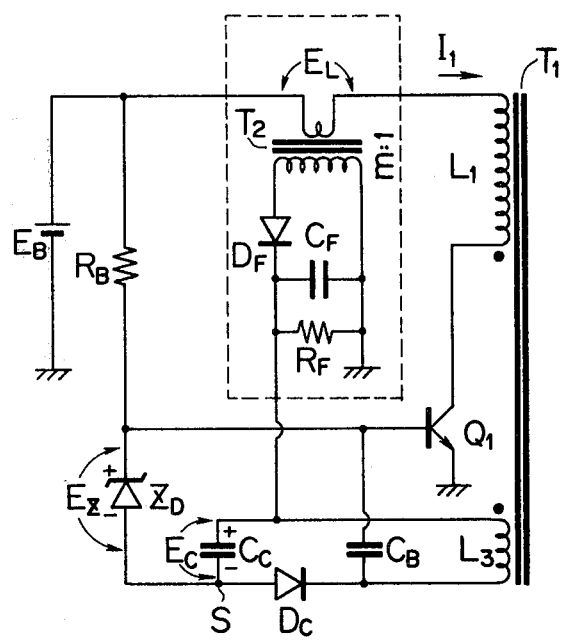
FIG. 10 is a circuit diagram showing still a further embodiment of the present invention.

While FIG. 8 shows an embodiment in which the equivalent internal resistance of the power source device is changed stepwisely, FIG. 9 shows an embodiment in which the equivalent internal resistance is continuously changed. In FIG. 9, variable resistor $VR_2$ and resistor $R_5$ are only required to constitute a load for AC component and so, a capacitor may be inserted in series to protect the variable resistor $VR_2$. FIG. 10 shows a further embodiment of the switching power source device according to the present invention. In this Figure, the secondary circuit of the transformer $T_1$ is omitted. In this embodiment, the primary winding of the detecting transformer $T_2$ is inserted between the DC power source $E_B$ and the primary winding $L_1$ of the transformer $T_1$ to detect the current $I_1$ flowing into the transformer $T_1$. In this instance, assume that the load resistance $Z_F$ of the secondary winding of the detecting transformer $T_2$ is $Z_F$ and that the turn ratio between the primary and the secondary winding of the detecting transformer $T_2$ is 1:m. Then, the voltage $E_L$ produced across the primary winding of the detecting transformer $T_2$ is:

$$E_L = \frac{Z_F}{m^2} \cdot \frac{E_B}{L_1} (t - \frac{t_1^2}{2T}) \qquad (6)$$

The voltage $E_L$ is boosted to m times by the detecting transformer $T_2$ and the peak value thereof is charged in the capacitor $C_F$, so that the detection voltage $E_F$ substantially becomes: $E_F = m E_L$.

Figure 11:
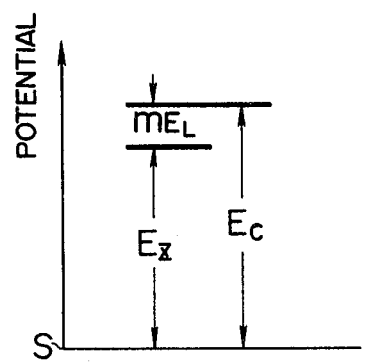
FIG. 11 illustrates the relations of various control voltages in FIG. 10.

Thus, the relation of the control voltages in the embodiment of FIG. 10 becomes simple as shown in FIG. 11. Further, the comparison voltage $E_C$ becomes: $E_C = E_z + mE_L$. As a result, when time $t = t_1$, the comparison voltage $E_C$ is:

$$E_C = E_Z + \frac{Z_F}{m} \cdot \frac{E_B}{L_1} t_1 (1 - \frac{t_1}{2T}) \qquad (7)$$

By suitably selecting the value of $Z_F/m$ in the same manner as in the aforementioned equation (4), the same effect as already described may be obtained.

Figure 12:
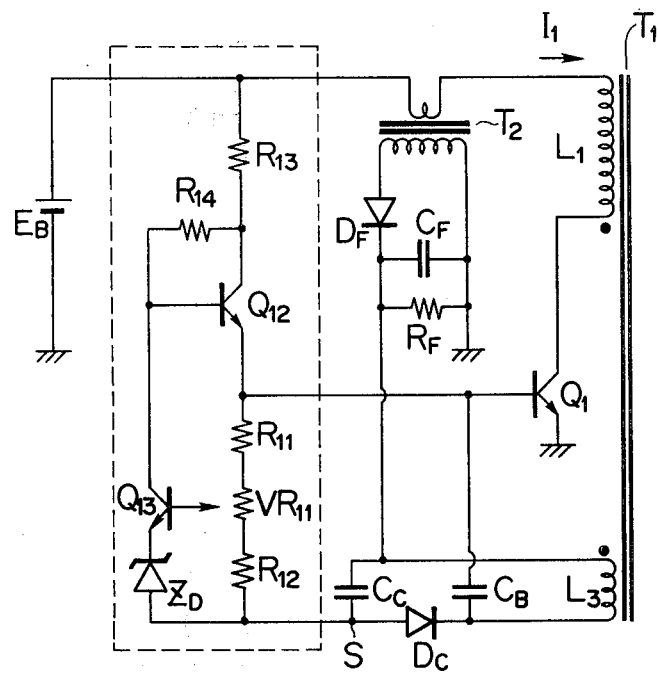
FIG. 12 is a circuit diagram showing a modification of the FIG. 10 embodiment.

FIG. 12 shows an embodiment in which the switching power source device of FIG. 10 is modified into a variable output voltage type. Again in this Figure, the secondary circuit of the transformer $T_1$ is omitted.

Instead of the bias resistor $R_B$ shown in FIG. 10, a resistor $R_{13}$ and the collector-emitter of a transistor $Q_{12}$ are series-connected together, and instead of the Zener diode $Z_D$ shown in FIG. 10, a resistor $R_{11}$, a variable resistor $VR_{11}$ and a resistor $R_{12}$ are series-connected together. The emitter of a transistor $Q_{13}$ is connected to the potential reference point S through Zener diode $Z_D$, and the collector thereof is connected to the base of the transistor $Q_{12}$. Connected between the base and collector of the transistor $Q_{12}$ is a resistor $R_{14}$ which constitutes a load for the transistor $Q_{13}$. Incidentally, the resistor $R_{13}$ is used when the output voltage of the DC power source $E_B$ is high, and it may be eliminated when the collector-emitter withstand voltage of the transistor $Q_{12}$ is sufficiently great.

In the above-described construction, a divisional voltage provided from the movable terminal of the variable resistor $VR_{11}$ with respect to the potential reference point S and the reference voltage of the Zener diode $Z_D$ are detected and compared with each other, and the result of the comparison is amplified by the transistor $Q_{13}$ to control the transistor $Q_{12}$, whereby the voltage between the base of the transistor $Q_1$ and the potential reference point S is determined. More specifically, by displacing the position of the movable terminal of the variable resistor $VR_{11}$, the voltage between the transistor $Q_1$ and the potential reference point S can be varied and accordingly, the output voltage produced across the load $R_L$ can be varied.

Figure 13:
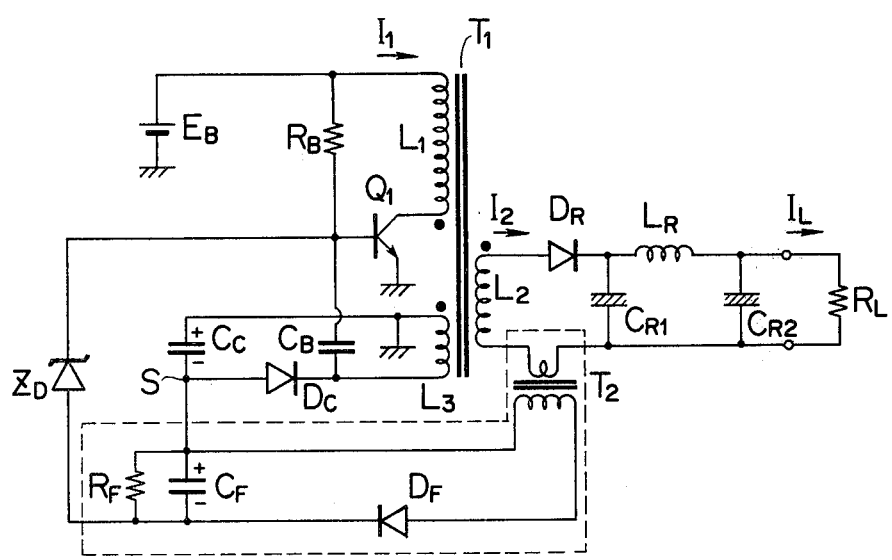
FIG. 13 is a circuit diagram showing a further embodiment of the present invention.

In each of the foregoing embodiments, the current $I_1$ flowing to the primary circuit of the transformer $T_1$ has been described, but according to the present invention, as in the embodiment of FIG. 13, it is of course possible to obtain the same effect even by means for detecting the current $I_2$ flowing to the secondary circuit of the transformer $T_1$. For example, where the primary circuit of the transformer $T_1$ is of low voltage and heavy current and the secondary circuit thereof is of relatively high voltage and not so heavy current, the use of the current $I_2$ flowing to the secondary winding $L_2$ of the transformer $T_1$ as the current to flow to the detecting transformer $T_2$ may lead to lighter weight and compactness of the device because it eliminates the necessity of increasing the wire diameter of the windings used in the detecting transformer.

Further, in any of the embodiments of the present invention, the detection voltage is directly rectified into a DC voltage, but where the detection voltage is not of a sufficiently great value, the detection voltage may first be amplified by the use of an amplifier and then rectified into a DC voltage.

Furthermore, in the flyback type switching power source device wherein a flyback voltage is superposed on the source voltage of the DC power source $E_B$ to obtain a stable output voltage across the load, flows of current into and out of the same winding of the transformer alternately occur so that the current assumes a triangular waveform instead of a saw tooth waveform, whereas the present invention can achieve the same effect as described even by means for detecting the triangular wave current.

Thus, the switching power source device according to the present invention, unlike the common high-performance switching power source device, does not effect voltage stabilization by using a high-gain amplifier or the like to obtain a great feedback ratio, but only determines the circuit constants so as to compensate for the power on the power supply side including power loss, against the fluctuation of the load power and may therefore greatly simplify the circuit construction and yet may always ensure a stable output voltage to be produced across the load. Further, as described in connection with FIG. 5, the equivalent internal resistance of the power source device may be selected arbitrarily to any of a positive value, zero and a negative value and, by predetermining the circuit constants, a conspicuous effect may be obtained for a long term in the voltage stabilizing characteristic against fluctuations of the power source and load. Furthermore, when the negative resistance as desired is to be realized, the resulting negative resistance tends to be instable, whereas the present invention may also obtain a very stable negative resistance.

Although the present invention has been described with respect to some specific embodiments, it is to be understood that the invention is not restricted thereto but covers any and all modifications and changes which may be made within the scope of the appended claims.

What is claimed is:

1. A flyback type switching power source device alternately having a time during which energy is stored in a transformer by flowing a current to the primary winding of said transformer and a time during which the stored energy is taken out of the secondary winding of said transformer, the improvement comprising:
    (a) means for detecting the current flowing into said primary winding,
    (b) means for converting said current into a DC voltage proportional to the magnitude thereof,
    (c) means for superimposing said DC voltage upon a reference voltage,
    (d) means for comparing said superimposed voltage with a DC voltage resulting from the conversion of a voltage induced in a tertiary winding of said transformer during the time for taking out the energy stored in said transformer,
    whereby the time during which energy is stored in said transformer may be controlled.

2. A switching power source device as recited in claim 1 wherein said means for converting said current into a DC voltage comprises means for varying the magnitude of said DC voltage.

3. A switching power source device as recited in claim 1 wherein said reference voltage is derived from a Zener diode.

4. A flyback type switching power source device alternately having a time during which energy is stored in a transformer by flowing a current to the primary winding of said transformer and a time during which the stored energy is taken out of the secondary winding of said transformer, the improvement comprising:
    (a) means for detecting a current flowing out of the secondary winding,
    (b) means for converting said current into a DC voltage proportional to the magnitude thereof,
    (c) means for superimposing said DC voltage upon a reference voltage,
    (d) means for comparing said superimposed voltage with a DC voltage resulting from the conversion of a voltage induced in a tertiary winding of said transformer during the time for taking out the energy stored in said transformer,
    whereby the time during which energy is stored in said transformer may be controlled.

5. A switching power source device as recited in claim 5 wherein said means for converting said current into a DC voltage comprises means for varying the magnitude of said DC voltage.

6. A switching power source device as recited in claim 4 wherein said reference voltage is derived from a Zener diode.

* * * * *